(12) United States Patent
Yamazaki (10) Patent No.: US 9,248,758 B2
(45) Date of Patent: Feb. 2, 2016

(54) VEHICLE CREEP TORQUE CONTROL

(75) Inventor: Masakazu Yamazaki, Nagoya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/357,799

(22) PCT Filed: Nov. 14, 2011

(86) PCT No.: PCT/JP2011/076205
§ 371 (c)(1),
(2), (4) Date: May 13, 2014

(87) PCT Pub. No.: WO2013/072991
PCT Pub. Date: May 23, 2013

(65) Prior Publication Data
US 2014/0309828 A1    Oct. 16, 2014

(51) Int. Cl.
*B60W 30/18* (2012.01)
*B60L 15/20* (2006.01)
(Continued)

(52) U.S. Cl.
CPC ............ *B60L 15/2063* (2013.01); *B60K 6/445* (2013.01); *B60L 3/108* (2013.01); *B60L 11/123* (2013.01); *B60L 11/14* (2013.01); *B60L 11/1861* (2013.01); *B60W 10/08* (2013.01); *B60W 20/00* (2013.01); *B60W 30/18063* (2013.01); *B60L 2210/30* (2013.01); *B60L 2210/40* (2013.01); *B60L 2220/14* (2013.01); *B60L 2220/42* (2013.01); *B60L 2240/12* (2013.01); *B60L 2240/423* (2013.01); *B60L 2240/425* (2013.01); *B60L 2240/441* (2013.01); *B60L 2240/445* (2013.01); *B60L 2240/545* (2013.01); *B60L 2240/547* (2013.01); *B60L 2240/549* (2013.01); *B60L 2250/24* (2013.01); *B60L 2250/26* (2013.01); *B60L 2260/28* (2013.01); *B60L 2270/145* (2013.01); *B60W 2540/103* (2013.01); *B60W 2540/12* (2013.01); *B60W 2710/083* (2013.01); *B60W 2710/085* (2013.01);
(Continued)

(58) Field of Classification Search
None
See application file for complete search history.

(56) References Cited

U.S. PATENT DOCUMENTS 6,023,648 A * 2/2000 Murasugi ................ F16H 61/20
477/93
8,439,795 B2 * 5/2013 Miyamoto ............ B60W 10/08
477/203

(Continued)

FOREIGN PATENT DOCUMENTS

JP       10-75505 A      3/1998
JP       2002-152910 A   5/2002

(Continued)

*Primary Examiner* — Thomas Tarcza
*Assistant Examiner* — Richard Goldman
(74) *Attorney, Agent, or Firm* — Kenyon & Kenyon LLP (57) ABSTRACT

Creep control is performed, in response to an accelerator-off operation, to control a second motor to cause a predetermined creep torque Tcr to be output from the second motor to a driveshaft. First creep cut-off control is performed, in response to a brake-on operation during the creep control, to control the second motor to cause a torque reduced from the creep torque Tcr at a high rate by a predetermined high variation $\Delta Thi$ to be output from the second motor to the driveshaft. Subsequent to the first creep cut-off control, second creep cut-off control is performed to control the second motor to cause a torque reduced at a low rate by a predetermined low variation $\Delta Tlow$ smaller than the predetermined high variation $\Delta Thi$ to be output from the second motor to the driveshaft.

5 Claims, 6 Drawing Sheets (51) Int. Cl.
B60K 6/445 (2007.10)
B60W 10/08 (2006.01)
B60W 20/00 (2006.01)
B60L 11/14 (2006.01)
B60L 11/12 (2006.01)
B60L 3/10 (2006.01)
B60L 11/18 (2006.01)

(52) U.S. Cl.
CPC ......... *Y02T 10/6217* (2013.01); *Y02T 10/6239* (2013.01); *Y02T 10/648* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7275* (2013.01); *Y10S 903/903* (2013.01)

(56) References Cited

U.S. PATENT DOCUMENTS

| | | | | |
|---|---|---|---|---|
| 8,905,897 | B2* | 12/2014 | Oh | F16H 61/20 477/203 |
| 9,008,924 | B2* | 4/2015 | Jackson | B60W 30/18063 477/21 |
| 2003/0205930 | A1* | 11/2003 | Smart | B60K 6/48 303/20 |
| 2004/0204285 | A1* | 10/2004 | Ueno | B60K 6/46 477/4 |
| 2009/0112432 | A1* | 4/2009 | Ueoka | B60T 7/122 701/70 |
| 2009/0203496 | A1* | 8/2009 | Staub | B60W 10/06 477/3 |
| 2010/0004809 | A1* | 1/2010 | Itoh | B60K 6/445 701/22 |
| 2010/0076637 | A1* | 3/2010 | Ueoka | B60T 7/042 701/22 |
| 2010/0145588 | A1* | 6/2010 | Reuschel | B60W 10/02 701/70 |
| 2011/0046829 | A1* | 2/2011 | Tamai | B60L 11/126 701/22 |
| 2011/0288735 | A1* | 11/2011 | Shelton | B60W 10/02 701/68 |
| 2012/0071296 | A1* | 3/2012 | Miyamoto | B60W 10/08 477/27 |
| 2013/0017928 | A1* | 1/2013 | Oh | F16H 61/20 477/94 |
| 2013/0197731 | A1* | 8/2013 | Schum | B60L 15/2063 701/22 |
| 2013/0288855 | A1* | 10/2013 | Monsere | B60L 15/2045 477/24 |
| 2014/0129068 | A1* | 5/2014 | Higa | B60W 20/00 701/22 |
| 2014/0309828 | A1* | 10/2014 | Yamazaki | B60L 11/123 701/22 |

FOREIGN PATENT DOCUMENTS

| | | |
|---|---|---|
| JP | 2006-050811 A | 2/2006 |
| JP | 2007-159171 A | 6/2007 |
| JP | 2009-011057 A | 1/2009 |

* cited by examiner

VEHICLE CREEP TORQUE CONTROL

CROSS-REFERENCE TO RELATED APPLICATIONS

This is a national phase application based on the PCT International Patent Application No. PCT/JP2011/076205 filed Nov. 14, 2011, the entire contents of which are incorporated herein by reference.

TECHNICAL FIELD

The present invention relates to a vehicle, and more specifically to a vehicle including: a motor that is capable of outputting power to a driveshaft linked with a driveshaft; a battery that is capable of supplying electric power to the motor; and a braking force application system that applies a braking force to the vehicle in response to a braking operation.

BACKGROUND ART

A proposed configuration of such a vehicle includes: a motor that outputs a vehicle driving force to a driveshaft connected with drive wheels; a battery that supplies electric power to this motor; and a hydraulic or another brake mechanism provided on wheels. This proposed vehicle sets a creep torque as the vehicle driving force according to the vehicle speed in an accelerator-off state and performs creep cut-off that reduces the creep torque in response to a brake operation (for example, PTL 1). This vehicle sets a greater rate of change (time rate of change) for reduction of the creep torque with a more abrupt depression of a brake pedal in the accelerator-off state, i.e., performs the creep cut-off more quickly, in order to improve the drivability of the vehicle and improve fuel consumption.

CITATION LIST

Patent Literature

[PTL 1] JP 2009-11057A

SUMMARY OF INVENTION

In the above vehicle, however, a gentler depression of the brake pedal causes a smaller rate of change for reduction of the creep torque in the accelerator-off state. This may increase the time to completely cut off the creep torque from the motor and reduce energy efficiency (increase fuel consumption). The more abrupt depression of the brake pedal, on the other hand, causes the greater rate of change for reduction of the creep torque in the accelerator-off state. This may, for example, increase the degree of opposite rotation or twist of the driveshaft upon completion of creep cut-off and cause a shock. The degree of opposite rotation or twist is referred to herein as a twist-back amount or degree.

The primary object of the vehicle of the invention is to achieve improvement in energy efficiency and suppression of a potential shock accompanied with creep cut-off.

In order to achieve the above primary object, the vehicle of the invention employs the following configuration.

A vehicle according to the present invention is a vehicle including: a motor that is capable of supplying a torque to a driveshaft and linked with the driveshaft; a battery that is capable of supplying electric power to the motor; and a braking force application system that applies a braking force to the vehicle in response to a braking operation, the vehicle further including: a controller performing creep control that controls the motor to set the torque supplied to the driveshaft at a predetermined creep torque, in response to an accelerator-off operation. Subsequently, in response to a brake-on operation, the controller further performs a first creep cut-off control that controls the motor to reduce the torque from the creep torque at a first rate of change with time. Subsequent to the first creep cut-off control, the controller performs a second creep cut-off control that controls the motor to reduce the torque at a second rate of change with time, which is smaller than the first rate of change with time.

The vehicle of the invention performs the creep control that controls the motor to cause the predetermined creep torque to be output from the motor to the driveshaft, in response to an accelerator-off operation; performs the first creep cut-off control that controls the motor to cause the torque reduced from the creep torque by the first change degree to be output from the motor to the driveshaft, in response to a brake-on operation during the creep control; and subsequent to the first creep cutoff control, performs the second creep cut-off control that controls the motor to cause the torque reduced by the second change degree smaller than the first change degree to be output from the motor to the driveshaft. Compared with a configuration that performs creep cut-off to cause a torque reduced from the creep torque only by a relatively small second change degree to be output from a motor, this configuration reduces the power consumption of the motor and improves the energy efficiency (improves the fuel consumption). Compared with a configuration that performs creep cut-off to cause a torque reduced from the creep torque only by a relatively large first change degree to be output from the motor, this suppresses a twist-back degree of the driveshaft upon termination of reduction of the creep torque (creep cut-off) and thereby suppresses a potential shock upon termination of the creep cut-off. As a result, this achieves improvement in energy efficiency and suppression of a potential shock accompanied with creep cut-off. The "creep torque" herein may be a predetermined torque according to the vehicle speed (torque differing by the vehicle speed) or a predetermined torque as a constant torque irrespective of the vehicle speed in the range that the vehicle speed is lower than a specified low vehicle speed. The first or second "change degree" may be a change rate of torque per unit time (time rate of change).

In the vehicle of the invention, the controller may start the second creep cut-off control when the torque output from the motor is reduced to or below a predetermined torque reference value as a smaller torque than the creep torque, during the first creep cut-off control. This configuration ensures an appropriate switchover from the first creep cut-off control to the second creep cut-off control. The "torque reference value" herein may be a value specified in advance to quickly reduce the torque of the motor such that a potential shock is suppressed upon termination of the second creep cut-off control.

Additionally, in the vehicle of the invention, the controller may start the second creep cut-off control when a vehicle speed is reduced to or below a predetermined vehicle speed reference value, during the first creep cut-off control. This configuration ensures an appropriate switchover from the first creep cut-off control to the second creep cut-off control. The "vehicle speed reference value" herein may be a value specified in advance to quickly reduce the torque of the motor in such a degree that suppresses a potential shock upon termination of the second creep cut-off control.

Further, the vehicle of the invention, the controller may perform the second creep cut-off control that controls the motor to cause a torque reduced to a value 0 by the second change degree to be output from the motor to the driveshaft.

In the vehicle of the invention, the controller may perform the first creep cut-off control in response to a brake-on operation during the creep control when the amount of brake operation is equal to or greater than a predetermined brake reference value and, subsequent to the first creep cut-off control, perform the second creep cut-off control. In this application, the controller may perform the first creep cut-off control in response to a brake-on operation during the creep control when the amount of brake operation is less than the brake reference value, and subsequent to the first creep cut-off control, control the motor to cause a torque reduced by the second change degree until the torque output from the motor reaches a target torque that decreases with an increase in amount of brake operation, to be output from the motor.

In the vehicle of the invention, the vehicle may include an internal combustion engine; a generator that is capable of transmitting electric power to and from the battery and capable of inputting and outputting power; and a planetary gear mechanism having three rotation elements connected with three shafts, the drive shaft, an output shaft of the internal combustion engine and a rotating shaft of the generator, wherein a rotating shaft of the motor is connected with the driveshaft.

DESCRIPTION OF EMBODIMENTS

The following describes some aspects of the invention with reference to embodiments.

Figure 1:
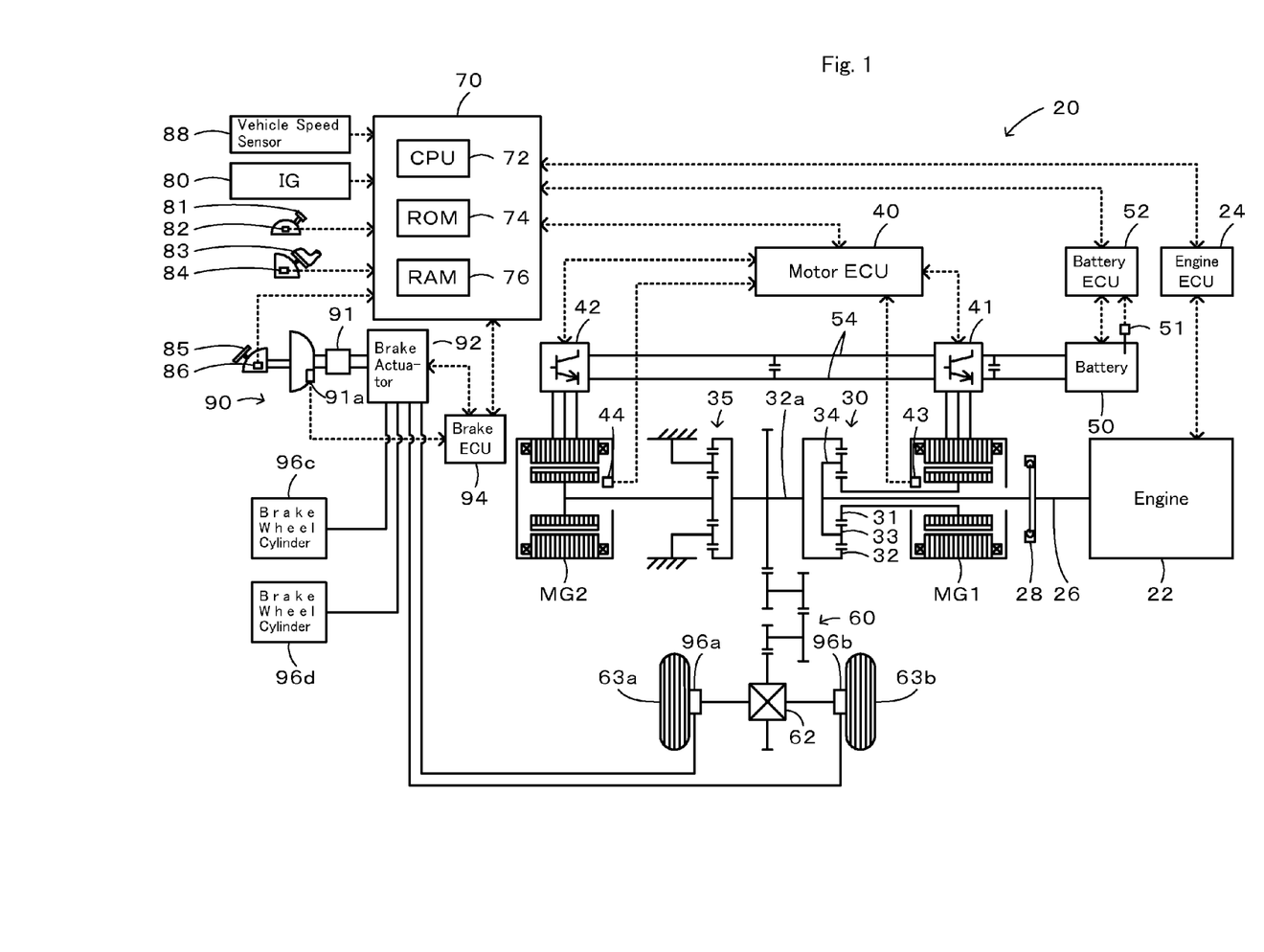
FIG. 1 is a configuration diagram illustrating the general configuration of a hybrid vehicle 20 according to one embodiment of the invention.

FIG. 1 is a configuration diagram illustrating the general configuration of a hybrid vehicle 20 according to one embodiment of the invention. As illustrated, the hybrid vehicle 20 includes: an engine 22 using gasoline or light oil as fuel; an engine electronic control unit (hereinafter referred to as engine ECU) 24 configured to drive and control the engine 22; a planetary gear 30 configured such that a carrier 34 holding a plurality of pinion gears 33 to be rotatable on their own axes and revolvable around the carrier 34 is connected to a crankshaft 26 of the engine 22 via a damper 28 and a ring gear 32 is connected to a ring gear shaft 32a serving as a driveshaft linked to drive wheels 63a and 63b via a differential gear 62 and a gear mechanism 60; a motor MG1, for example, a synchronous motor generator and configured to have a rotor connected to the sun gear 31 of the planetary gear 30; a motor MG2 provided as, for example, a synchronous motor generator and configured to have a rotor connected to the ring gear shaft 32a via a reduction gear 35; inverters 41 and 42 used to drive the motors MG1 and MG2; a motor electronic control unit (hereinafter referred to as motor ECU) 40 configured to control the inverters 41 and 42 and thereby drive and control the motors MG1 and MG2; a battery 50 provided as, for example, a lithium-ion battery and configured to transmit electric power to and from the motors MG1 and MG2 via a power line 54 which the inverters 41 and 42 are connected with; a battery electronic control unit (hereinafter referred to as battery ECU) 52 configured to manage the battery 50; an electronically controlled hydraulic brake system 90 including a brake actuator 92 for controlling brakes of the drive wheels 63a and 63b and non-illustrated driven wheels and a brake electronic control unit (hereinafter referred to as brake ECU) 94 configured to control the brake actuator 92; and a hybrid electronic control unit (hereinafter referred to as HVECU) 70 configured to control the entire vehicle.

Although not illustrated, the engine ECU 24 is implemented by a CPU-based microprocessor and includes a ROM that stores processing programs, a RAM that temporarily stores data, input-output ports and a communication port other than the CPU. The engine ECU 24 inputs signals via the input port from a variety of sensors that detect the operating conditions of the engine 22: for example, a crank position $\theta cr$ from a crank position sensor that detects the rotating position of the crankshaft 26; a cooling water temperature Tw from a water temperature sensor that detects the temperature of cooling water in the engine 22; a cylinder pressure Pin from a pressure sensor placed in a combustion chamber; a cam position $\theta ca$ from a cam position sensor that detects the rotating position of a cam shaft to open and close an air intake valve and an exhaust valve for air intake and exhaust into and from the combustion chamber; a throttle position TH from a throttle valve position sensor that detects the position of a throttle valve; an intake air flow Qa from an air flow meter attached to an air intake pipe; an intake air temperature Ta from a temperature sensor similarly attached to the air intake pipe; an air-fuel ratio AF from an air-fuel ratio sensor placed in an exhaust system; and an oxygen signal O2 from an oxygen sensor similarly placed in the exhaust system. The engine ECU 24 outputs via the output port a variety of control signals to drive the engine 22: for example, a drive signal to a fuel injection valve; a drive signal to a throttle motor operated to adjust the throttle valve position; a control signal to an ignition coil integrated with an igniter; and a control signal to a variable valve timing mechanism that is capable of varying the open-close timing of the air intake valve. The engine ECU 24 communicates with the HVECU 70 to control the operation of the engine 22 in response to control signals from the HVECU 70 and output data regarding the operating conditions of the engine 22 to the HVECU 70 as necessary. The engine ECU 24 also calculates a rotation speed of the crankshaft 26, i.e., a rotation speed Ne of the engine 22, based on the signal from the non-illustrated crank position sensor attached to the crankshaft 26.

Although not illustrated, the motor ECU 40 is implemented by a CPU-based microprocessor and includes a ROM that stores processing programs, a RAM that temporarily stores data, input-output ports and a communication port other than the CPU. The motor ECU 40 inputs via the input port signals required to drive and control the motors MG1 and MG2: for example, rotational positions θm1 and θm2 from rotational position detection sensors 43 and 44 that detect the rotational positions of rotators of the motors MG1 and MG2; and phase currents to be applied to the motors MG1 and MG2, which are detected by non-illustrated current sensors. The motor ECU 40 outputs via the output port, for example, switching control signals to non-illustrated switching elements of the inverters 41 and 42. The motor ECU 40 communicates with the HVECU 70 to drive and control the motors MG1 and MG2 in response to control signals from the HVECU 70 and output data regarding the operating conditions of the motors MG1 and MG2 to the HVECU 70 as necessary. The motor ECU 40 also calculates rotation angular velocities ωm1 and ωm2 and rotation speeds Nm1 and Nm2 of the motors MG1 and MG2, based on the rotational positions θm1 and θm2 of the rotors of the motors MG1 and MG2 from the rotational position detection sensors 43 and 44.

Although not illustrated, the battery ECU 52 is implemented by a CPU-based microprocessor and includes a ROM that stores processing programs, a RAM that temporarily stores data, input-output ports and a communication port other than the CPU. The battery ECU 52 inputs signals required to manage the battery 50: for example, an inter-terminal voltage Vb from a non-illustrated voltage sensor placed between the terminals of the battery 50; a charge-discharge current Ib from a non-illustrated current sensor attached to a power line connected to the output terminal of the battery 50; and a battery temperature Tb from a temperature sensor 51 attached to the battery 50. The battery ECU 52 sends data regarding the conditions of the battery 50 as necessary to the HVECU 70 by communication. For the purpose of managing the battery 50, the battery ECU 52 also calculates a state of charge SOC, which is a ratio of the power capacity dischargeable from the battery 50 to the entire capacity, based on an integral value of the charge-discharge current Ib detected by the current sensor, while calculating input and output limits Win and Wout as maximum allowable powers to be charged in and discharged from the battery 50, based on the calculated state of charge SOC and the battery temperature Tb. A specific procedure of determining the input and output limits Win and Wout of the battery 50 may set base values of the input and output limits Win and Wout based on the battery temperature Tb, set an output limit correction coefficient and an input limit correction coefficient based on the state of charge SOC of the battery 50 and multiply the set base values of the input and output limits Win and Wout by the correction coefficients.

The hydraulic brake system 90 includes a brake master cylinder 90 and brake wheel cylinders 96a to 96d, in addition to the brake actuator 92 and the brake ECU 94. The brake actuator 92 is configured to adjust the hydraulic pressure of the brake wheel cylinders 96a to 96d in order to cause a braking torque, which corresponds to a contribution by brakes in a braking force to be applied to the vehicle based on vehicle speed V and pressure of the brake master cylinder 90 (brake pressure) generated in response to the depression of a brake pedal 85, to be applied to the drive wheels 63a and 63b and the non-illustrated driven wheels, and also to adjust the hydraulic pressure of the brake wheel cylinders 96a to 96d in order to cause a braking torque to be applied to the drive wheels 63a and 63b and the driven wheels independently of the depression of the brake pedal 85. The brake ECU 94 inputs, for example, a brake pedal force (BPF) from a master cylinder pressure sensor 91. The brake ECU 94 inputs, via non-illustrated signal lines, signals such as wheel speeds from non-illustrated wheel speed sensors attached to the drive wheels 63a and 63b and the driven wheels and a steering angle from a non-illustrated steering angle sensor, and performs the antilock brake system (ABS) function that prevents any of the drive wheels 63a and 63b and the driven wheels from being locked and slipped upon the driver's depression of the brake pedal 85, the traction control (TRC) that prevents either of the drive wheels 63a and 63b from being idled and slipped upon the driver's depression of an accelerator pedal 83, and the vehicle stability control (VSC) that maintains the stability of the vehicle during a vehicle turning operation. The brake ECU 94 communicates with the HVECU 70 to drive and control the brake actuator 92 in response to control signals from the HVECU 70 and output data regarding the conditions of the brake actuator 92 to the HVECU 70 as necessary.

The HVECU 70 is implemented by a CPU 72-based microprocessor and includes a ROM 74 that stores processing programs, a RAM 76 that temporarily stores data, non-illustrated input-output ports and a non-illustrated communication port other than the CPU 72. The HVECU 70 inputs via the input port, for example, an ignition signal from an ignition switch 80, a gearshift position SP from a gearshift position sensor 82 that detects the operational position of a gearshift lever 81, an accelerator opening Acc from an accelerator pedal position sensor 84 that detects the depression amount of the accelerator pedal 83, a brake pedal position BP from a brake pedal position sensor 86 that detects the depression amount of the brake pedal 85 and a vehicle speed V from a vehicle speed sensor 88. The HVECU 70 is connected with the engine ECU 24, the motor ECU 40, the battery ECU 52 and the brake ECU 94 via the communication port to transmit the variety of control signals and data to and from the engine ECU 24, the motor ECU 40, the battery ECU 52 and the brake ECU 94 as described above.

The hybrid vehicle 20 of the embodiment configured as described above calculates a required torque Tr* to be output to the ring gear shaft 32a as the driveshaft based the an accelerator opening Acc corresponding to the driver's depression amount of the accelerator pedal and the vehicle speed V, and controls the operations of the engine 22, the motor MG1 and the motor MG2 to output a required power corresponding to this required torque Tr* to the ring gear shaft 32a. The operation controls of the engine 22, the motor MG1 and the motor MG2 include: a torque conversion operation mode that controls the operation of the engine 22 to cause the power corresponding to the required power to be output from the engine 22, while driving and controlling the motors MG1 and MG2 to cause all the power output from the engine 22 to be subjected to torque conversion by the planetary gear 30, the motor MG1 and the motor MG2 and to be output to the ring gear shaft 32a; a charge-discharge operation mode that controls the operation of the engine 22 to cause the total power corresponding to the sum of the required power and the electric power required for charging or discharging the battery 50 to be output from the engine 22, while driving and controlling the motor MG1 and the motor MG2 to cause all or part of the power output from the engine 22 to be subjected to torque conversion by the planetary gear 30, the motor MG1 and the motor MG2 and to be output to the ring gear shaft 32a, accompanied with charging or discharging the battery 50; and a motor operation mode that stops the operation of the engine 22, while driving and controlling the motor MG2 to cause the power corresponding to the required power to be output to the ring gear shaft 32a. The torque conversion operation mode and the charge-discharge operation mode are both the mode of controlling the engine 22 and the motors MG1 and MG2 to cause the required power to be output to the ring gear shaft 32a, accompanied with the operation of the engine 22 and have no substantial difference in control. Hereinafter these two modes are collectively called engine operation mode.

In the engine operation mode, the HVECU 70 sets a required torque Tr* to be output to the ring gear shaft 32a or the driveshaft, based on the accelerator opening Acc from the accelerator pedal position sensor 84 and the vehicle speed V from the vehicle speed sensor 88; calculates a drive power Pdrv* required for driving by multiplying the set required torque Tr* by a rotation speed Nr of the ring gear shaft 32a (rotation speed obtained, for example, by dividing the rotation speed Nm2 of the motor MG2 by a gear ratio Gr of the reduction gear 35 or by multiplying the vehicle speed V by a conversion factor); and subtracts a required charge-discharge power Pb* (having positive value in the state of discharge from the battery 50) based on the state of charge SOC of the battery 50 from the calculated drive power Pdrv* to set a required power Pe* as the power to be output from the engine 22. The HVECU 70 then sets a target rotation speed Ne* and a target torque Te* of the engine using an operation line (for example, fuel consumption-optimizing operation line) representing the relationship between the rotation speed Ne and the torque Te of the engine 22 that enables the required power Pe* to be output from the engine 22 with high efficiency; sets a torque command Tm1* as the torque to be output from the motor MG1 by rotation speed feedback control to make the rotation speed Ne of the engine 22 so as to be the target rotation speed Ne* in the range of the input and output limits Win and Wout of the battery 50; subtracts a torque applied to the ring gear shaft 32a via the planetary gear 30 in the state that the motor MG1 is driven with the torque command Tm1* from the required torque Tr* to set a torque command Tm2* of the motor MG2; and sends the set target rotation speed Ne* and target torque Te* to the engine ECU 24 while sending the torque commands Tm1* and Tm2* to the motor ECU 40. When receiving the target rotation speed Ne* and the target torque Te*, the engine ECU 24 performs intake air amount control, fuel injection control and ignition control of the engine 22 to cause the engine 22 to be operated with the target rotation speed Ne* and the target torque Te*. When receiving the torque commands Tm1* and Tm2*, the motor ECU 40 performs switching control of the switching elements of the inverters 41 and 42 to drive the motors MG1 and MG2 with the torque commands Tm1* and Tm2*.

In the motor operation mode, the HVECU 70 sets the required torque Tr* to be output to the ring gear shaft 32a or the driveshaft, based on the accelerator opening Acc and the vehicle speed V; sets a value 0 to the torque command Tm1* of the motor MG1; sets the torque command Tm2* of the motor MG2 to cause the required torque Tr* to be output to the ring gear shaft 32a in the range of the input and output limits Win and Wout of the battery 50; and sends the torque commands Tm1* and Tm2* to the motor ECU 40. When receiving the torque commands Tm1* and Tm2*, the motor ECU 40 performs switching control of the switching elements of the inverters 41 and 42 to drive the motors MG1 and MG2 with the torque commands Tm1* and Tm2*.

Figure 2:
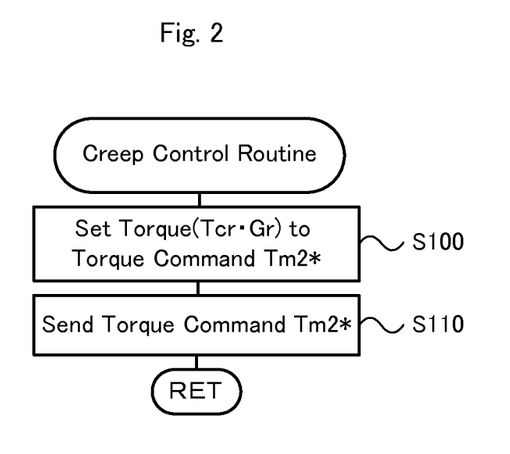
FIG. 2 is a flowchart showing an exemplary creep control routine performed by a hybrid vehicle electronic control unit (HVECU) 70.
Figure 3:
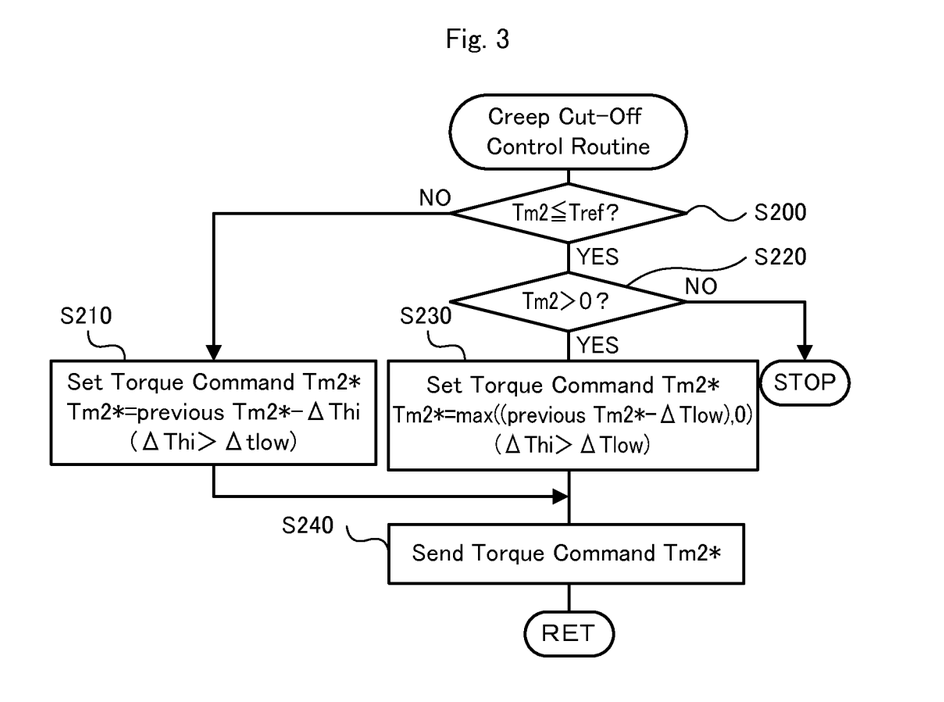
FIG. 3 is a flowchart showing an exemplary creep cut-off control routine performed by the HVECU 70.

The following describes the operations of the hybrid vehicle 20 of the embodiment or more specifically the operations to cut off the torque for creeping in response to a brake-on operation during output of the torque for creeping from the motor MG2 in an accelerator-off state in the motor operation mode. FIG. 2 is a flowchart showing an exemplary creep control routine performed by the HVECU 70. FIG. 3 is a flowchart showing an exemplary creep cut-off control routine performed by the HVECU 70. The routine of FIG. 2 is repeatedly performed at predetermined time intervals (for example, every several msec) until an accelerator-on operation or a brake-on operation in the accelerator-off state at the vehicle speed V of less than a specified low vehicle speed Vref (for example, 5 km per hour or 10 km per hour). The routine of FIG. 3 is triggered by a brake-on operation in the course of the creep control routine of FIG. 2 and is performed at predetermined time intervals (for example, every several msec). Identification of the accelerator-on or accelerator-off state and identification of the brake-on or brake-off state may be based on determination of whether the accelerator opening Acc is equal to or greater than a predetermined reference threshold or based on determination of whether the brake pedal force (BPF) is equal to or greater than a predetermined reference threshold. The following sequentially describes creep control and creep cut-off control.

When the creep control routine of FIG. 2 is triggered, the CPU 72 of the HVECU 70 sets the product of a predetermined creep torque Tcr and the gear ratio Gr of the reduction gear 35 to the torque command Tm2* of the motor MG2 (step S100) and sends the set torque command Tm2* to the motor ECU 40 (step S110), before terminating the creep control routine. When receiving the torque command Tm2*, the motor ECU 40 performs switching control of the switching elements of the inverter 42 to drive the motor MG2 with the torque command Tm2*. In the currently-active motor operation mode, the engine 22 stops operation, and the motor MG1 stops driving with the torque command Tm1* of the motor MG1 set to the value 0. According to this embodiment, the creep torque Tcr used here is a fixed torque for creeping to be output to the ring gear shaft 32a or the driveshaft when the vehicle speed V from the vehicle speed sensor 88 is lower than the specified low vehicle speed Vref and when the accelerator opening Acc from the accelerator pedal position sensor 84 is equal to the value 0 (0%), which is determined in advance and is stored in the ROM 74. The specified low vehicle speed Vref is used to determine the range of vehicle speed of creeping.

Such control causes the predetermined creep torque Tcr to be output from the motor MG2 to the ring gear shaft 32a or the driveshaft for driving, in response to an accelerator-off operation. The forgoing describes creep control. The following describes creep cut-off control triggered by a brake-on operation during such creep control. In the hybrid vehicle 20 of the embodiment, in response to a brake-on operation during the creep control, the brake ECU 94 of the hydraulic brake system 90 controls the brake actuator 92 to apply a braking torque corresponding to the depression of the brake pedal 85, i.e., a braking torque corresponding to the brake pedal force (BPF) to be applied to the drive wheels 63a and 63b and the driven wheels. This braking torque basically reduces the speed of the vehicle and stops the vehicle.

When the creep cut-off control routine of FIG. 3 is triggered, the CPU 72 of the HVECU 70 first determines whether the torque Tm2 output from the motor MG2 is equal to or less than a predetermined torque reference value Tref (step S200). When the torque Tm2 from the motor MG2 is greater than the torque reference value Tref, the CPU 72 determines the need to relatively quickly reduce the torque Tm2 from the motor MG2. The CPU 72 then sets the torque command Tm2* of the motor MG2 to a difference by subtracting a predetermined high variation ΔThi (positive value) from the torque command Tm2* (previous Tm2*) of the motor MG2 previously used for control of the motor MG2 (step S210) and sends the set torque command Tm2* to the motor ECU 40 (step S240), before terminating the creep cut-off control routine. According to the embodiment, the torque Tm2 output from the motor MG2 is the torque command Tm2* (previous Tm2*) of the motor MG2 previously used for control of the motor MG2. In the first cycle of this routine, the torque command Tm2* of the motor MG2 previously used for control of the motor MG2 is the torque command Tm2* of the motor MG2 set lastly in the creep control routine of FIG. 2. Otherwise, the torque command Tm2* of the motor MG2 previously used for control of the motor MG2 is the torque command Tm2* of the motor MG2 set in a previous cycle of this routine. The torque Tm2 output from the motor MG2 may be an estimated torque from the detected value of a non-illustrated current sensor that detects phase currents flowing through the three phases of the motor MG2. The torque reference value Tref (for example, torque corresponding to 40% or 50% of the creep torque Tcr) is used for determination of whether a rate (time rate of change) as the variation in torque per unit time for reduction of the torque Tm2 from the motor MG2 (time interval at which the creep cut-off control routine of FIG. 3 is performed according to the embodiment) is to be switched over from a high rate by the predetermined high variation ΔThi for relatively quick reduction of the torque Tm2 to a low rate by a predetermined low variation ΔTlow (positive value smaller than the predetermined high variation ΔThi) for relatively gentle reduction of the torque Tm2. As the result of this process flow, the motor MG2 is controlled to cause a torque reduced from the creep torque Tcr at the high rate by the predetermined high variation ΔThi to be output from the motor MG2 to the ring gear shaft 32a or the driveshaft (hereinafter called first creep cut-off control).

When the torque Tm2 output from the motor MG2 is equal to or less than the torque reference value Tref, the CPU 72 determines the need to relatively gently reduce the torque Tm2 from the motor MG2. The CPU 72 then determines whether the torque Tm2 from the motor MG2 is greater than the value 0 (step S220). When the torque Tm2 is greater than the value 0, the CPU 72 sets the torque command Tm2* of the motor MG2 to the greater between a difference by subtracting the predetermined low variation ΔTlow from the previous Tm2* and the value 0 (step S230) and sends the set torque command Tm2* to the motor ECU 40 (step S240), before terminating the creep cut-off control routine. The determination of whether the torque Tm2 from the motor MG2 is greater than the value 0 is based on determination of whether the torque command Tm2* of the motor MG2 is reduced to the value 0. In other words, this operation determines whether the creep cut-off control is to be terminated. Accordingly, the operation of step S230 sets the torque command Tm2* of the motor MG2 in the range of not less than the value 0. When the torque Tm2 from the motor MG2 is less than the torque reference value Tref and is equal to the value 0, the creep cut-off control routine is terminated. As the result of this process flow, the motor MG2 is controlled to cause a torque reduced to the value 0 at the low rate by the predetermined low variation ΔTlow to be output from the motor MG2 to the ring gear shaft 32a or the driveshaft (hereinafter called second creep cut-off control).

Figure 4:
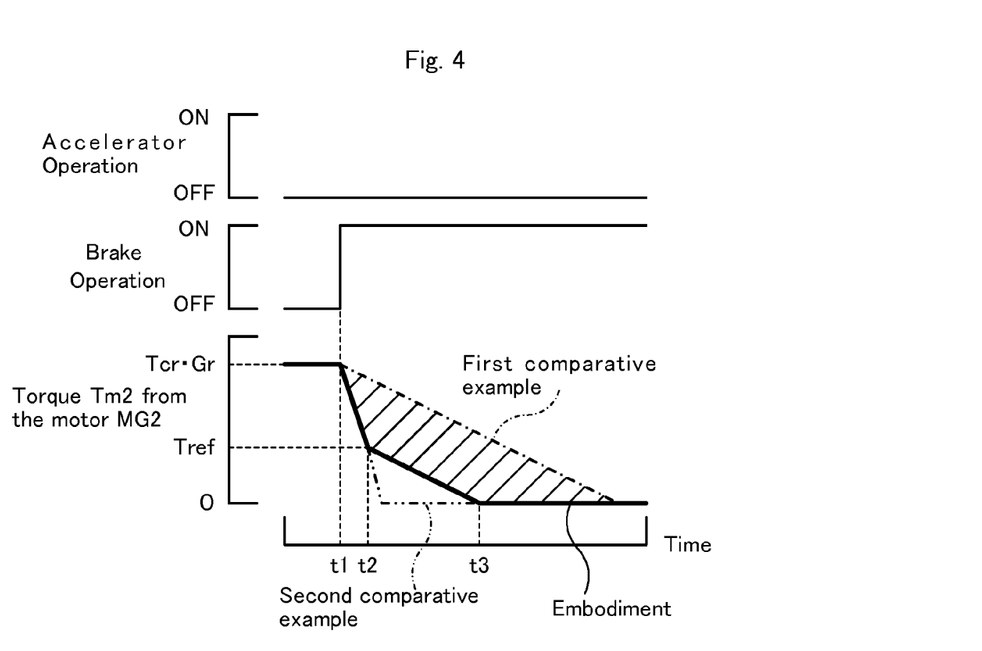
FIG. 4 is a diagram illustrating exemplary time changes of an accelerator operation, a brake operation and a torque Tm2 from a motor MG2 during creep cut-off control.

FIG. 4 is a diagram illustrating exemplary time changes of the accelerator operation, the brake operation and the torque Tm2 from the motor MG2 during creep cut-off control. In the illustration, a time change in torque Tm2 from the motor MG2 according to the embodiment is shown by the thick solid line; a time change in torque Tm2 from the motor MG2 according to a first comparative example in which the torque Tm2 is reduced to the value 0 at the low rate by the predetermined low variation ΔTlow in response to a brake-on operation is shown by the one-dot chain line; and a time change in torque Tm2 from the motor MG2 according to a second comparative example in which the torque Tm2 is reduced to the value 0 at the high rate by the predetermined high variation ΔThi in response to a brake-on operation is shown by the two-dot chain line. According to this embodiment, in response to a brake-on operation (time t1) during the creep control in the accelerator-off state, the torque Tm2 from the motor MG2 is reduced relatively quickly from the torque corresponding to the creep torque Tcr (Tcr·Gr) to the torque reference value Tref at the high rate by the predetermined high variation ΔThi (time t2). Subsequently, the torque Tm2 from the motor MG2 is reduced relatively gently to the value 0 at the low rate by the predetermined low variation ΔTlow (time t3). According to the first comparative example, on the other hand, as shown by a hatched area with oblique lines in the illustration, output of the greater torque Tm2 from the motor MG2 continues for a longer time. This results in increasing the power consumption of the motor MG2. According to the second comparative example, the torque output from the motor MG2 to the ring gear shaft 32a or the driveshaft is reduced quickly to the value 0. This results in increasing a twist-back amount of the ring gear shaft 32a upon termination of the creep cut-off control (twist amount in the opposite direction reversed from the twist direction), thus causing gear rattle in the gear mechanism including the planetary gear 30 and the reduction gear 35 to cause a shock. The embodiment performs the first creep cut-off control of reducing the torque Tm2 of the motor MG2 from the torque corresponding to the creep torque Tcr at the relatively high rate and subsequently the second creep cut-off control of reducing the torque Tm2 of the motor MG2 at the relatively low rate. This reduces the power consumption of the motor MG2 and improves the energy efficiency (improves the fuel consumption), while suppressing a potential shock upon termination of the creep cut-off control.

The following provides supplementary explanation on the torque reference value Tref for switchover between the first creep cut-off control and the second creep cut-off control, the predetermined high variation ΔThi and the predetermined low variation ΔTlow. According to the embodiment, the predetermined high variation ΔThi is experimentally or otherwise specified in advance as a value to reduce the creep torque Tcr as quickly as possible. According to the embodiment, the predetermined low variation ΔTlow is experimentally or otherwise specified in advance to be a small value in such a degree that suppresses a potential shock caused by output of no torque from the motor MG2. The torque reference value Tref is experimentally or otherwise specified in advance as a value to reduce the torque Tm2 of the motor MG2 from the creep torque Tcr as quickly as possible in such a degree that suppresses a potential shock upon termination of the second creep cut-off control after the switchover when the first creep cut-off control at the high rate by the predetermined high variation ΔThi is switched over to the second creep cut-off control at the low rate by the predetermined low variation ΔTlow.

As described above, the hybrid vehicle 20 of the embodiment performs creep control in response to an accelerator-off operation, which controls the motor MG2 to cause the predetermined creep torque Tcr to be output from the motor MG2 to the ring gear shaft 32a or the driveshaft. In response to a brake-on operation during the creep control, the hybrid vehicle 20 performs the first creep cut-off control which controls the motor MG2 to cause the torque reduced from the creep torque Tcr at the high rate by the predetermined high variation ΔThi to be output from the motor MG2 to the ring gear shaft 32a, and subsequent to the first creep cut-off control, performs the second creep cut-off control which controls the motor MG2 to cause the torque reduced at the low rate by the predetermined low variation ΔTlow, which is smaller than the predetermined high variation ΔThi, to be output from the motor MG2 to the ring gear shaft 32a. This achieves improvement in energy efficiency and suppression of a potential shock, accompanied with creep cut-off.

The hybrid vehicle 20 of the embodiment switches over from the first creep cut-off control to the second creep cut-off control when the torque Tm2 output from the motor MG2 is reduced to or below the torque reference value Tref. Alternatively, such switchover may be performed when the vehicle speed V is reduced to or below a vehicle speed reference value Vref. The vehicle speed reference value Vref used here may be experimentally or otherwise specified in advance as a value to reduce the torque Tm2 of the motor MG2 from the creep torque Tcr as quickly as possible in such a degree that suppresses a potential shock on termination of the creep cut-off control.

The hybrid vehicle 20 of the embodiment switches over from the first creep cut-off control to the second creep cut-off control when the torque Tm2 output from the motor MG2 is reduced to or below the torque reference value Tref. Alternatively, such switchover may be performed when a predetermined time period has elapsed since a start of the first creep cut-off control. The predetermined time used here may be experimentally or otherwise specified in advance as a value to reduce the torque Tm2 of the motor MG2 from the creep torque Tcr as quickly as possible in such a degree that suppresses a potential shock on termination of the creep cut-off control.

The hybrid vehicle 20 of the embodiment uses the fixed torque which is specified in advance to be constant irrespective of the vehicle speed V in the range that the vehicle speed V is lower than the specified low vehicle speed Vref, as the creep torque Tcr used for creep control. Alternatively, the creep torque Tcr may be a torque specified in advance to be reduced to the value 0 (when V=Vref) with an increase in vehicle speed V in the range that the vehicle speed V is lower than the specified low vehicle speed Vref. In the latter case, the torque of the motor MG2 may be reduced at a high rate or at a low rate from the creep torque Tcr according to the vehicle speed V on the occasion of a brake-on operation during the creep control.

Figure 5:
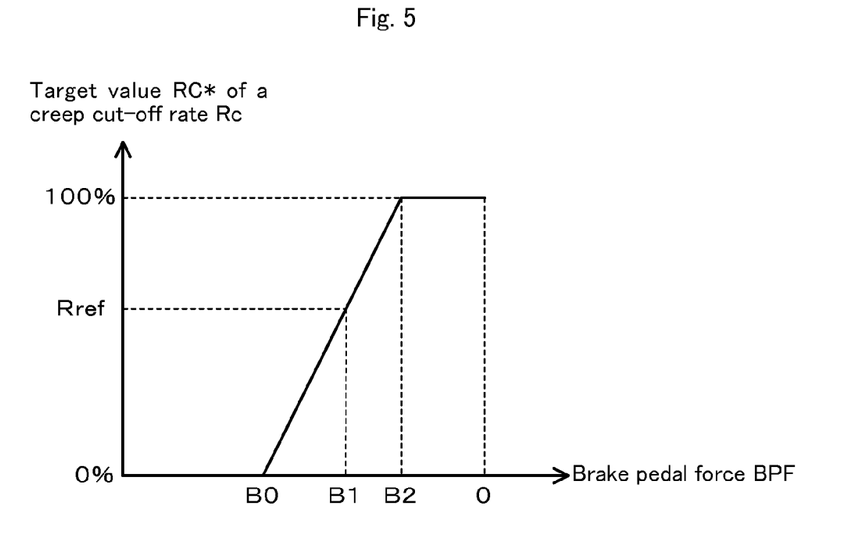
FIG. 5 is a diagram illustrating an exemplary relationship between a brake pedal force (BPF) and a target value RC* of a creep cut-off rate Rc according to a modification.

The hybrid vehicle 20 of the embodiment performs the creep cut-off control triggered by a brake-on operation during the creep control to reduce the torque Tm2 of the motor MG2 to the value 0 at the high rate by the predetermined high variation ΔThi or at the low rate by the predetermined low variation ΔTlow. A modification may reduce the torque Tm2 from the motor MG2 by increasing a creep cut-off rate Rc according to the brake pedal force (BPF) by a high rate value ΔRhi or by a smaller low rate value ΔRlow, without using the predetermined high variation ΔThi or the predetermined low variation ΔTlow. For example, as shown in FIG. 5, a target value Rc* of the creep cut-off rate may be determined to have an increasing tendency with an increase in brake pedal force (BPF). More specifically, the target value Rc* is set to a value 0 (0%) when the brake pedal force (BPF) is not greater than a value B0, is set to a value 1 (100%) when the brake pedal force (BPF) is not less than a value B2, and is increased from the value 0 (0%) to the value 1 (100%) with an increase in brake pedal force (BPF) in the range of greater than the value B0 and less than the value B2. In the illustration, a value Rref as the target value Rc* of the creep cut-off rate Rc when the brake pedal force (BPF) is equal to a value B1 (where B0<B1<B2) indicates a reference value experimentally or otherwise specified in advance for switchover of the creep cut-off control, like the torque reference value Tref of the embodiment. In this modification, the creep cut-off rate Rc may be increased from the value 0 by the high rate value ΔRhi and, after reaching the reference value Rref, increased from the reference value Rref to the target value Rc* by the low rate value ΔRlow. The torque command Tm2* of the motor MG2 may be calculated as a difference (Tcr−Tcut) by subtracting a torque Tcut (=Tcr·Gr·Rc) for creep cut-off, which is obtained by multiplying the torque (Tcr·Gr) corresponding to the creep torque Tcr by the creep cut-off rate Rc, from the creep torque Tcr. This modification achieves substantially the same control as that of the embodiment on the assumption that the occurrence of a brake-on operation is determined when the brake pedal force (BPF) is equal to or greater than the value B2.

In this modification, the occurrence of a brake-on operation may be determined when the brake pedal force (BPF) is equal to or greater than the value B0 or the value B1 smaller than the value B2. When the brake pedal force (BPF) is equal to or greater than the value B2 on the occasion of a brake-on operation during the creep control, this modification achieves substantially the same control as that of the embodiment by increasing the creep cut rate Rc from the value 0 to the reference value Rref by the high rate value ΔRhi and subsequently increasing the creep cut rate Rc from the reference value Rref to the value 1 by the low rate value ΔRlow. When the brake pedal force (BPF) is less than the value B2 on the occasion of a brake-on operation during the creep control, on the contrary, in the case that the target value Rc* according to the brake pedal force (BPF) is greater than the reference value Rref, creep cut-off control may be terminated after increasing the creep cut-off rate Rc from the value 0 to the reference value Rref by the high rate value ΔRhi and subsequently increasing the creep cut-off rate Rc from the reference value Rref to the target value Rc* by the low rate value ΔRlow. In the case that the target value Rc* according to the brake pedal force (BPF) is not greater than the reference value Rref, on the other hand, creep cut-off control may be terminated after increasing the creep cut-off rate Rc from the value 0 to the target value Rc* by the high rate value ΔRhi. In the latter case that the target value Rc* according to the brake pedal force (BPF) is not greater than the reference value Rref, creep cut-off control may be terminated after increasing the creep cut-off rate Rc from the value 0 to a predetermined value Rtmp smaller than the target value Rc* (for example, 50%, 60% or 70% of the target value Rc*) by the high rate value ΔRhi and subsequently increasing the creep cut-off rate Rc from the predetermined value Rtmp to the target value Rc* by the low rate value ΔRlow.

Figure 6:
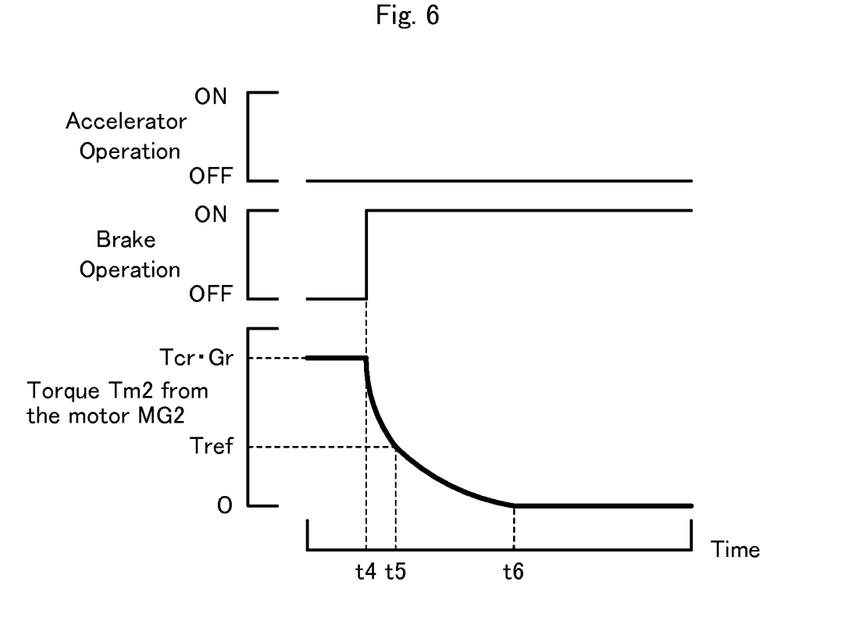
FIG. 6 is a diagram illustrating exemplary time changes of the accelerator operation, the brake operation and the torque Tm2 from the motor MG2 during creep cut-off control according to a modification.

The hybrid vehicle 20 of the embodiment reduces the torque Tm2 of the motor MG2 at the high rate by the predetermined high variation ΔThi and subsequently reduces the torque Tm2 of the motor MG2 at the low rate by the predetermined low variation ΔTlow. In other words, the hybrid vehicle 20 of the embodiment controls the motor MG2 with setting of the torque command Tm2* of the motor MG2 to be reduced at the high rate and subsequently controls the motor MG2 with setting of the torque command Tm2* of the motor MG2 to be reduced at the low rate. A modification may control the motor MG2 with setting of the torque command Tm2* of the motor MG2 to be reduced relatively quickly using a smoothing process with a first time constant and subsequently control the motor MG2 with setting of the torque command Tm2* of the motor MG2 to be reduced relatively gently using a smoothing process with a second time constant larger than the first time constant. FIG. 6 illustrates exemplary time changes of the accelerator operation, the brake operation and the torque Tm2 from the motor MG2 when creep cut-off control is performed by the smoothing process of this modification.

Figure 7:
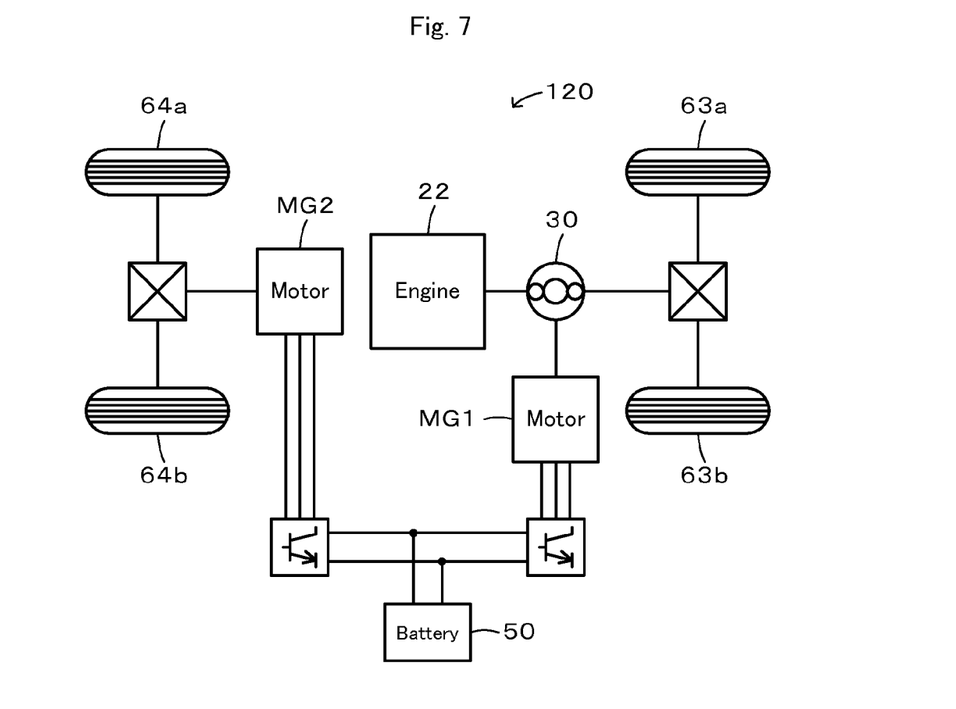
FIG. 7 is a configuration diagram illustrating the general configuration of a hybrid vehicle 120 according to a modification.

The hybrid vehicle 20 of the embodiment is configured to output the power from the motor MG2 to the ring gear shaft 32a or the driveshaft. As illustrated in a hybrid vehicle 120 of a modification in FIG. 7, the power from the motor MG2 may be connected to a driveshaft linked with a different axle (axle connected with wheels 64a and 64b in FIG. 7) from an axle connected with the ring gear shaft 32a (axle connected with the drive wheels 63a and 63b).

Figure 8:
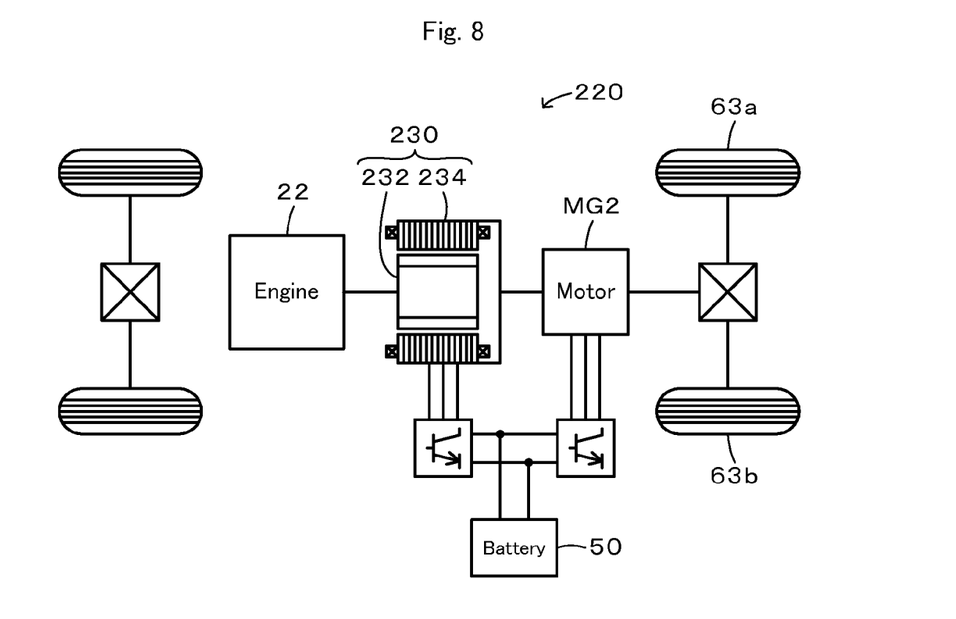
FIG. 8 is a configuration diagram illustrating the general configuration of a hybrid vehicle 220 according to a modification.

The hybrid vehicle 20 of the embodiment is configured to output the power from the engine 22 via the planetary gear 30 to the ring gear shaft 32a as the driveshaft connected with the drive wheels 63a and 63b. As illustrated in FIG. 8, a hybrid vehicle 220 of a modification may be equipped with a pair-rotor motor 230 that has an inner rotor 232 connected with a crankshaft of an engine 22 and an outer rotor 234 connected with a driveshaft to output power to drive wheels 63a and 63b and transmits part of the power from the engine 22 to the driveshaft while converting the remaining power into electric power.

Figure 9:
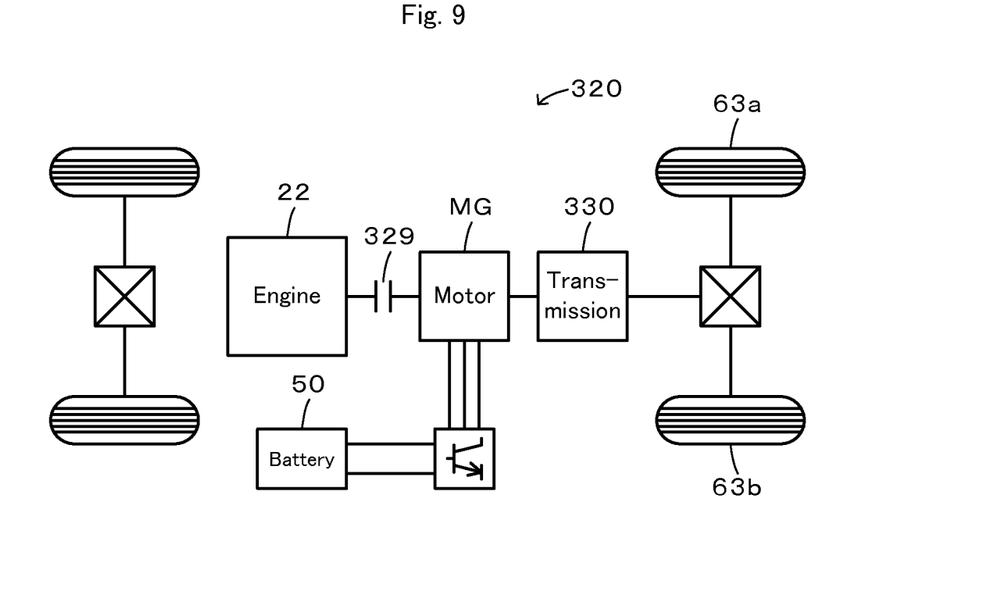
FIG. 9 is a configuration diagram illustrating the general configuration of a hybrid vehicle 320 according to a modification.

The hybrid vehicle 20 of the embodiment is configured to output the power from the engine 22 via the planetary gear 30 to the ring gear shaft 32a as the driveshaft connected with the drive wheels 63a and 63b and output the power from the motor MG2 to the ring gear shaft 32a. As illustrated in a hybrid vehicle 320 of a modification in FIG. 9, a motor MG may be attached via a transmission 330 to a driveshaft connected with drive wheels 63a and 63b, and an engine 22 may be connected via a clutch 329 to a rotating shaft of the motor MG. This hybrid vehicle 320 is configured to output the power from the engine 22 via the rotating shaft of the motor MG and the transmission 330 to the driveshaft and output the power from the motor MG via the transmission 330 to the driveshaft.

Figure 10:
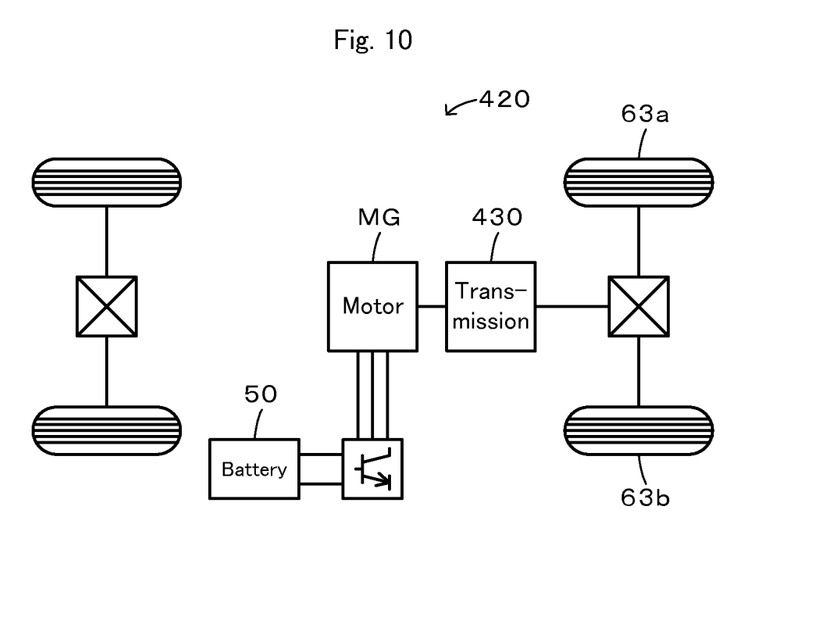
FIG. 10 is a configuration diagram illustrating the general configuration of an electric vehicle 420 according to a modification.

The embodiment describes application of the invention to the hybrid vehicle 20 configured to output the power from the engine 22 to the ring gear shaft 32a or the driveshaft and output the power from the motor MG2. As illustrated in an electric vehicle 420 of an embodiment in FIG. 10, the invention may also be applied to an electric vehicle of the simple configuration equipped with a motor MG to output power for driving via a transmission 430 to a driveshaft linked with drive wheels 63a and 63b.

The embodiment describes the invention as an aspect of the hybrid vehicle 20, but the invention may be implemented by an aspect of a vehicle other than the automobile (for example, train).

The following describes the correspondence relationship between the primary components of the embodiment and the primary components of the invention described in Summary of Invention. The motor MG2 of the embodiment corresponds to the "motor"; the battery 50 corresponds to the "battery"; and the hydraulic brake system 90 corresponds to the "braking force application system". The HVECU 70 performing the creep control routine of FIG. 2 in response to an accelerator-off operation, which sets and sends the torque command Tm2* of the motor MG2 to the torque (Tcr·Gr) corresponding to the creep torque Tcr, and performing the creep cut-off control routine of FIG. 3 in response to a brake-on operation during the creep control, which sets and sends the torque command Tm2* of the motor MG2 to be reduced at the high rate by the predetermined high variation ΔThi and subsequently reduced by the predetermined low variation ΔTlow, and the motor ECU 40 controlling the motor MG2 with the torque command Tm2* correspond to the "controller". The engine 22 corresponds to the "internal combustion engine"; the motor MG1 corresponds to the "generator"; and the planetary gear 30 corresponds to the "planetary gear mechanism."

The "motor" is not limited to the motor MG2 provided as the synchronous motor generator but may be any type of motor that is capable of outputting power to a driveshaft linked with drive wheels, for example, induction motor. The "battery" is not limited to the battery 50 provided as the lithium-ion battery but may be any type of battery that is capable of supplying electric power to a motor, for example, nickel-metal hydride battery, nickel-cadmium battery or lead-acid battery. The "braking force application system" is not limited to the hydraulic brake system 90 but may be any system that applies a braking force to the vehicle in response to a braking operation. The "controller" is not limited to the combination of the HVECU 70 and the motor ECU 40 but may be configured as a single electronic control unit. The "controller" is not limited to the configuration of performing the control with setting the torque command Tm2* of the motor MG2 to the torque (Tcr·Gr) corresponding to the creep torque Tcr in response to an accelerator-off operation and performing the control with setting the torque command Tm2* of the motor MG2 to be reduced at the high rate by the predetermined high variation ΔThi and subsequently reduced by the predetermined low variation ΔTlow in response to a brake-on operation during the above control, but may be any configuration of performing creep control that controls a motor to cause a predetermined creep torque to be output from the motor to a driveshaft in response to an accelerator-off operation, performing first creep cut-off control that controls the motor to cause a torque reduced from the creep torque by a first change degree to be output from the motor to the driveshaft in response to a brake-on operation during the creep control and subsequent to the first creep cut-off control, performing second creep cut-off control that controls the motor to cause a torque reduced to the value 0 by a second change degree smaller than the first change degree to be output from the motor to the driveshaft.

The "internal combustion engine" is not limited to the internal combustion engine that outputs power using a hydrocarbon-type fuel such as gasoline or light oil but may be any type of internal combustion engine, for example, hydrogen engine. The "generator" is not limited to the motor MG1 provided as the synchronous motor generator but may be any type of generator that is capable of transmitting electric power to and from a battery and capable of inputting and outputting power. The "planetary gear mechanism" is not limited to the planetary gear 30 described above but may be any planetary gear mechanism that has three rotation elements connected with three shafts, a driveshaft, an output shaft of an internal combustion engine and a rotating shaft of a generator, for example, double pinion-type planetary gear mechanism or a combination of multiple planetary gear mechanisms to have rotation elements connected with four or more shafts.

The correspondence relationship between the primary components of the embodiment and the primary components of the invention, regarding which the problem is described in Summary of Invention, should not be considered to limit the components of the invention, regarding which the problem is described in Summary of Invention, since the embodiment is only illustrative to specifically describes the aspects of the invention, regarding which the problem is described in Summary of Invention. In other words, the invention, regarding which the problem is described in Summary of Invention, should be interpreted on the basis of the description in the Summary of Invention, and the embodiment is only a specific example of the invention, regarding which the problem is described in Summary of Invention.

The aspect of the invention is described above with reference to the embodiment. The invention is, however, not limited to the above embodiment but various modifications and variations may be made to the embodiment without departing from the scope of the invention.

INDUSTRIAL APPLICABILITY

The present invention is applicable in, for example, manufacturing industries of vehicles.

The invention claimed is:

1. A vehicle comprising:
a motor that is capable of supplying a torque to a driveshaft and linked with the driveshaft;
a battery that is capable of supplying electric power to the motor;
a braking force application system that applies a braking force to the vehicle in response to a braking operation; and
a controller programmed to perform a creep control that controls the motor to set the torque supplied to the driveshaft at a predetermined creep torque, in response to an accelerator-off operation, wherein
in response to a brake-on operation during the creep control, the controller is further programmed to perform a first creep cut-off control that controls the motor to reduce the torque from the predetermined creep torque at a first rate of change with time, and subsequent to the first creep cut-off control, the controller is further programmed to perform a second creep cut-off control that controls the motor to reduce the torque at a second rate of change with time, the second rate of change with time being smaller than the first rate of change with time.

2. The vehicle according to claim 1, wherein
the controller is programmed to start the second creep cut-off control when the torque supplied by the motor is reduced to or below a predetermined torque reference value during the first creep cut-off control, the predetermined torque reference value being smaller than the predetermined creep torque.

3. The vehicle according to claim 1, wherein
the controller is programmed to start the second creep cut-off control when a vehicle speed is reduced to or below a predetermined vehicle speed reference value during the first creep cut-off control.

4. The vehicle according to claim 1, wherein
the controller is programmed to perform the second creep cut-off control such that the motor reduces the torque to zero at the second rate of change with time.

5. The vehicle according to claim 1, further comprising:
an internal combustion engine;
a generator that is capable of transmitting electric power to and from the battery and capable of inputting and outputting power; and
a planetary gear mechanism having three rotation elements connected with three shafts, the driveshaft, an output shaft of the internal combustion engine and a rotating shaft of the generator, wherein
the rotating shaft of the generator is connected with the driveshaft.

* * * * *